United States Patent
Ashford et al.

(10) Patent No.: US 7,370,610 B2
(45) Date of Patent: May 13, 2008

(54) ON-BOARD FUEL FRACTIONATION SYSTEM AND METHODS TO GENERATE AN ENGINE STARTING FUEL

(75) Inventors: Marcus Ashford, Tuscaloosa, AL (US); Ron Matthews, Austin, TX (US)

(73) Assignee: The Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 11/676,208

(22) Filed: Feb. 16, 2007

(65) Prior Publication Data

US 2007/0193852 A1 Aug. 23, 2007

Related U.S. Application Data

(60) Provisional application No. 60/774,683, filed on Feb. 17, 2006.

(51) Int. Cl.
F02B 51/00 (2006.01)
(52) U.S. Cl. .......................... 123/3; 123/576; 123/179.8
(58) Field of Classification Search .................... 123/3, 123/575, 576, 179.8
See application file for complete search history.

(56) References Cited

U.S. PATENT DOCUMENTS

| | | | | |
|---|---|---|---|---|
| 1,613,718 | A | * | 1/1927 | Parmelee ...................... 208/83 |
| 3,688,755 | A | * | 9/1972 | Grayson et al. ............. 123/549 |
| 3,783,841 | A | | 1/1974 | Hirschler, Jr. et al. |
| 3,794,000 | A | | 2/1974 | Hodgkinson |
| 3,799,125 | A | * | 3/1974 | Hutchinson ...................... 123/3 |
| 3,851,633 | A | * | 12/1974 | Shih ............................ 123/575 |
| 5,357,908 | A | | 10/1994 | Sung et al. |
| 5,377,644 | A | * | 1/1995 | Krohm ........................ 123/520 |
| 6,119,637 | A | | 9/2000 | Matthews et al. |
| 6,378,489 | B1 | * | 4/2002 | Stanglmaier et al. ........ 123/304 |
| 2006/0037589 | A1 | * | 2/2006 | Gupta et al. ................. 123/557 |

OTHER PUBLICATIONS

Jason Ku, et al., "Conversion of a 1999 Silverado to Dedicated E85 with Emphasis on Cold Start and Cold Driveability," SAE Paper No. 2000-01-0590, 16 pages, U.S.A.

Marcus Ashford, et al., "An On-Board Distillation System to Reduce Cold-Start Hydrocarbon Emissions," SAE Paper No. 2003-01-3239, 14 pages, U.S.A.

M.D. Ashford and R.D. Matthews, "Further Development of an On-Board Distillation System for Generating a Highly Volatile Cold-Start Fuel," SAE Paper No. 2005-01-0233, 7 pages.

(Continued)

*Primary Examiner*—Erick Solis
(74) *Attorney, Agent, or Firm*—Bracewell & Giuliani LLP

(57) ABSTRACT

A Fuel Fractionation System (FFS) and associated methods to generate and store a fuel for internal combustion engines is provided. FFS provides a distillation column assembly to distill liquid fuel to form a volatile light fraction secondary fuel. The distillation column assembly includes a vaporization module to vaporize a feed fuel in the distillation column and includes a condensation module to condense heavy fraction components of the vaporized feed fuel. FFS also provides a controller positioned to control the vaporization of feed fuel in the distillation column to thereby control the separation of the feed fuel into light fraction fuel and heavy fraction fuel components, and positioned to control the condensation of the heavy fraction components so that fuel exiting a light fraction output port in the distillation column is substantially light fraction fuel components by volume.

31 Claims, 11 Drawing Sheets

OTHER PUBLICATIONS

Ikechukwu, Agbim,"Development of a Model to Optimize an On-Board System for the Distillation of Gasoline", Thesis presented at University of Texas Austin, Copyright Aug. 2002, 127 pages.

M.D. Ashford, "An On-Board Distillation System to Reduce Cold-Start Hydrocarbon Emissions from Gasoline . . . ", Dissertation, The University of Texas Austin, Copyright May 2004, 358 pages.

S. Aithala, "Development of an On-Board Gasoline Distillation System," Thesis, The University of Texas Austin, Dec. 2001.

Edward Kane, et al., "Refinement of a Dedicated E85 1999 Silverado with Emphasis on Cold Start and Cold Driveability," SAE Paper No. 2001-01-0679, 16 pages, U.S.A.

* cited by examiner

ON-BOARD FUEL FRACTIONATION SYSTEM AND METHODS TO GENERATE AN ENGINE STARTING FUEL

RELATED APPLICATIONS

This patent application claims the benefit of and priority to U.S. Provisional Application No. 60/774,683, filed on Feb. 17, 2006, incorporated by reference herein in its entirety.

BACKGROUND OF THE INVENTION

1. Field of the Invention

The present invention relates to the engine industry, particularly engine fuel systems to fuel powered engines, and more specifically to a fuel system and method for reducing vehicle hydrocarbon emissions.

2. Description of Related Art

Since as early as 1942, particularly in urban areas having a high concentration of motor vehicles, air pollution from internal combustion engines has been recognized as an undesirable consequence of a mobile society. Emissions from the internal combustion engines arise from several sources and can vary considerably in both amount and composition depending on the engine type, operating point, condition, design, and fuel volatility. For engines without some form of emissions controls, it has been estimated that twenty to twenty-five percent of the emissions arise from crankcase ventilation, sixty percent from exhaust, and the rest from evaporative losses, primarily associated with the fuel tank. The exhaust gas of the internal combustion engines contains various amounts of unburned hydrocarbons, carbon monoxide and oxides of nitrogen.

During recent years, researchers have investigated extensively various means of reducing exhaust emissions. This research has been quite fruitful. As a result, present-day automobiles emit only a fraction of undesirable materials compared to those of less than a decade ago. Despite such tremendous advances that have been made, further improvements are desirable. Federal standards continue to require further reduction of emissions. A major obstacle in achieving further reduction in exhaust emissions is the fact that in modern vehicles, 60-95% of hydrocarbon emissions occur during the first 30-90 seconds of operation of a vehicle engine following a cold start.

Applicants recognized that there are several factors that contribute to excess hydrocarbon emissions at low engine temperatures. One of the primary factors is poor vaporization of a sufficient fraction of the fuel at start-up temperature (i.e., below 30° C.) to achieve stable combustion necessitates a generous over-fueling during the cranking and warm-up periods. The over-fueling leads to high engine-out hydrocarbon emissions. This problem is exacerbated as a result of significant over-fueling because the emission system catalyst (i.e., catalytic converter) does not achieve its optimum operating temperature until 1-2 minutes after a cold start, and thus, it is incapable of oxidizing all of the unburned fuel including that resulting from the generous over-fueling during start-up.

In the past, attempts have been made to eliminate the need for a warm-up period by operating the engine on liquid petroleum gas, or other gaseous secondary fuels, during the warm-up period and then switching to gasoline after a normal operating temperature is obtained. The concept was used, for example, on tractors and other machinery. These devices had a separate fuel tank that was filled with a second type of fuel different from the fuel in the main tank. The fuel supply was then selected with a manually operated petcock valve. These systems were shown to be somewhat impractical, however, because the customer is required to fill two tanks, and the distribution network for dispensing gaseous fuels into vehicles is relatively sparse. Plus, customers would have to learn new behaviors and become comfortable with new safety procedures. Both are actions that consumers generally find unacceptable.

Due to the difficulties and impracticalities of using two separate fuels and two fuel source systems, other systems were developed which separated a single fuel into two components, one being more volatile than the other one. The systems, however, still had limitations, including the initial use of the primary fuel remaining in the fuel line at start-up, undesirable delays in starting the engine, the need for additional or complex pressurization and heating systems, efficient production of the volatile fuel, undesirable fuel tank heating resulting in increased evaporative emissions, and/or the use of complicated and expensive components.

The On-Board Distillation System (OBDS) described in U.S. Pat. No. 6,119,637, titled "On-Board Gasoline Distillation for Reduced Hydrocarbon Admission at Start-Up" by Matthews et al. and assigned to the assignee, incorporated herein by reference in its entirety, was developed to address the cold-start emissions issue by utilizing a vapor separator to extract, from gasoline or a gasoline/alcohol blend, etc., a highly-volatile secondary fuel for exclusive use during starting and warm-up, and purging the fuel lines with such secondary fuel prior to engine restart. OBDS was credited with increasing the amount of desired components by volume in the secondary fuel from 20-25% delivered by prior systems to up to approximately 50% or so. The special secondary start-up fuel helped eliminate the need for start-up over-fueling. The system, however, was primarily developed for fuel systems having an engine to fuel tank return line. Further, the system was generally configured to recycle primary fuel to further extract additional secondary fuel not extracted on a first pass through the vapor separator.

Therefore, recognized by the Applicants is a need for an even less complicated and less expensive system that more efficiently separates fuel into it various components to produce a secondary fuel having a composition by volume of between 80-100% desired components, provides an improved air-fuel mixture at engine start-up, provides for enhanced catalyst heating, reduces operating energy requirements, reduces any inherent increase in evaporative emissions, and, as a result, reduces total hydrocarbon emissions over that of prior systems.

SUMMARY OF THE INVENTION

In view of the foregoing, embodiments of the present invention beneficially provide a Fuel Fractionation System (FFS) and associated methods, which are an evolution of the On-Board Distillation System (OBDS), and which provides a less complicated and less expensive system that more efficiently separates fuel into it various components to produce a secondary fuel. Beneficially, the secondary fuel beneficially can have a composition by volume of between 80-100% hydrocarbons with a carbon number of six or below. Beneficially, the system can provide an improved air-fuel mixture at engine start-up, can provide for enhanced catalytic converter heating (and thus, higher efficiency), can reduce operating energy requirements, can reduce any inherent increase in evaporative emissions, and, as a result, can reduce total hydrocarbon emissions.

More specifically, according to an embodiment of the present invention, a fuel system for an engine having a fuel intake is provided. The fuel system includes a main fuel tank for supplying a primary fuel to the engine, a distillation column assembly to distill liquid fuel to form a volatile light fraction secondary fuel, and a controller positioned to control the vaporization of the feed fuel in the distillation column to thereby control the separation of the feed fuel into light fraction fuel and heavy fraction fuel components, and positioned to control the condensation of the heavy fraction so that fuel exiting the light fraction output port is substantially light fraction fuel components by volume.

The distillation column assembly can include a distillation column including a housing having an upper end portion, a lower end portion, and a medial portion extending therebetween. A fuel feed port extends through the medial portion of the housing and is positioned to receive feed fuel from the main fuel tank for distillation. The feed fuel includes light fraction fuel and heavy fraction fuel components. A light fraction output port extends through the upper end portion of the housing and is positioned to allow output of distilled light fraction fuel. A heavy fraction output port extends through the lower end portion of the housing and is positioned to allow output of heavy fraction fuel.

A vaporizing module is positioned adjacent the lower end portion of the housing to at least partially vaporize the feed fuel to enhance separation of the feed fuel into light fraction fuel and heavy fraction fuel components. A condensing module is positioned adjacent the upper end portion of the housing to condense heavy fraction fuel so that fuel exiting the light fraction output port is substantially light fraction fuel components by volume. A packed column including, for example, a three-dimensional column of porous metal is positioned within the housing between the vaporizing module and the condensing module to enhance fuel distillation. The enhanced surface area provided by the porous metal results in enhanced recirculation within the distillation column, improved concentration of the light end vapors at the top of the column, and improved concentration of heavy ends components at the bottom.

The controller provides control of the vaporization of the feed fuel by the vaporizing module and control of the condensation of the heavy ends or heavy fraction components by the condensing module responsive to various sensory inputs. The controller can ensure that the bottom of the distillation column is heated with a heating rate such that vapor generation occurs in the column at a desired temperature and pressure, and can ensure that the top of the distillation column is cooled such that condensation occurs at a desired temperature and pressure, resulting in the production of secondary fuel having the appropriate and desired characteristics.

The system can also include a heat exchanger to preheat the distillation column feed fuel stream and cool the hot heavy ends stream exiting the distillation column bottom. The heat exchanger beneficially can accomplish two major tasks. First, the heat exchanger can help mitigate concerns about increasing evaporative emissions due to increase in main fuel tank temperature by sending cooler fuel to the main fuel tank. Second, the heat exchanger can help conserve energy that would otherwise need to be applied in the distillation column by recovering heat that would ordinarily be sent to the main fuel tank or elsewhere.

According to another embodiment of the present invention, provided is a fuel fractionating system for an engine having a fuel intake. The system can include a main fuel tank for supplying a primary feed fuel to the engine, and a distillation column assembly to distill fuel to form a volatile light fraction secondary fuel from a portion of the primary feed fuel. The distillation column assembly can include a distillation column including a housing having an upper end portion, a lower end portion, and a medial portion extending therebetween, and a fuel feed port extending through the medial portion of the housing and positioned to receive feed fuel from the main fuel tank for distillation. A light fraction output port extends through the upper end portion of the housing and is positioned to allow output of distilled light fraction fuel. A heavy fraction output port extends through the lower end portion of the housing and is positioned to allow output of heavy fraction fuel. A vaporizing module is positioned adjacent the lower end portion of the housing to at least partially vaporize the feed fuel to separate the feed fuel into light fraction fuel and heavy fraction fuel components, and a condensing module is positioned adjacent the upper end portion of the housing to condense heavy fraction fuel components so that fuel exiting the light fraction output port is substantially light fraction fuel components by volume. The combination of the vaporizing module and condensing module synergistically results in the production of secondary fuel having the appropriate and desired characteristics.

Embodiments of the present invention also provide methods of fractionating fuel. For example, a method of fractionating fuel can include the step of providing a distillation column assembly including a distillation column to distill liquid fuel to form a volatile light fraction secondary fuel. The distillation column can include a light fraction output port extending through an upper end portion of the distillation column assembly and positioned to allow output of distilled light fraction fuel, and a heavy fraction output port extending through a lower end portion of the distillation column assembly and positioned to allow output of heavy fraction fuel. The method can also include the steps of supplying feed fuel to the distillation column, vaporizing at least a portion of the supply feed fuel in the distillation column to enhance separation of the feed fuel into light fraction fuel and heavy fraction fuel components, and condensing a portion of the vaporized fuel by a condensing module prior to the vaporized fuel exiting the light fraction output port to condense the heavy fraction fuel so that the vaporized fuel exiting the light fraction output port is substantially light fraction fuel components by volume. The method can also include the step of exchanging heat between the feed fuel being fed into the distillation column and heavy fraction fuel exiting the distillation column.

Beneficially, embodiments of the present invention provide the FFS and associated methods are an evolution of the OBDS, and thus, contain significant improvements over the OBDS in terms of performance, usability and packaging, for example. Embodiments of an on-board FFS and methods to generate a starting fuel for gasoline-powered engines, for example, beneficially provide (1) compact packaging, (2) more efficient, faster separation, (3) no need to wait for the engine to reach fully warmed operating temperature, e.g., since a distillation column need not be heated by engine coolant as typically with OBDS, and (4) bottoms liquid from FFS that can be consumed directly by the engine. Embodiments of the present invention can also beneficially eliminate or reduce the concern of higher evaporative emissions from returning warm fuel to main fuel tank, and can also beneficially enhance engine power output through a combination of ignition timing advance and consumption of high-octane bottoms liquid. Beneficially, the FFS light fraction secondary fuel can be expected to feature at least five times the vaporization at moderate temperatures (21° C.-27° C.) than standard gasoline, resulting in decreased catalytic converter light-off times (at least 50%) and hydrocarbon emissions reductions on the order of 80-90% or more.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Provided is a Fuel Fractionation System (FFS), which is an evolution of the On-Board Distillation System (OBDS). The various embodiments of the FFS differ from the OBDS and other alternative fuel systems in a number of very significant ways. FIGS. 1A-11 assist in illustrating embodiments of the FFS and methods and in highlighting some of these differences, particularly as compared to OBDS. Such major differences are best illustrated through examination of the major system components and processes such as, for example, Fuel Supply, Distillation, Overhead Condenser/Compressor, Disposition of Heavy Ends, Heat Recovery, and Fuel Utilization, described in more detail below.

Fuel Supply.

Figure 1A:
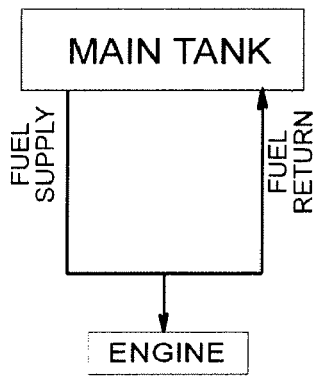
FIGS. 1A-1C are schematic block diagrams illustrating comparisons of fuel flow paths among stock configuration, OBDS configuration, and an FFS configuration according to an embodiment of the present invention.
Figure 1B:
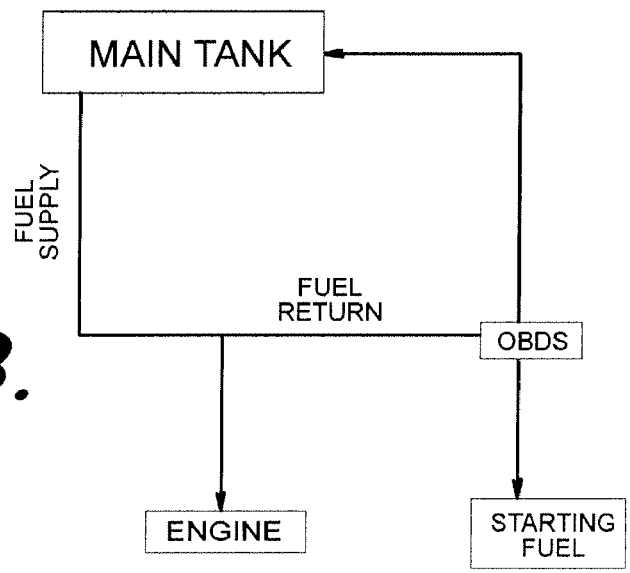
Figure 1C:
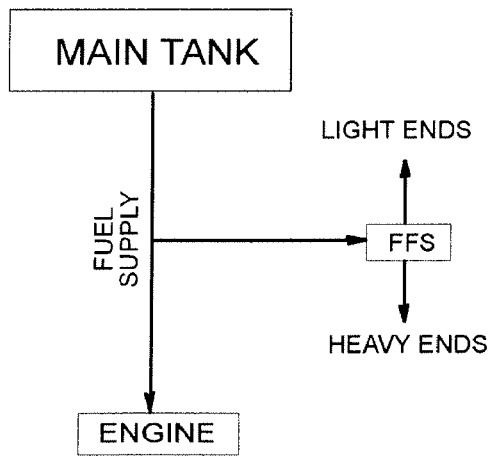

FIGS. 1A-1C, for example, illustrate the differences between the fuel supply designs of a typical OBDS fuel system (FIG. 1B) and an embodiment of FFS (FIG. 1C), with the stock configuration (FIG. 1A) being shown for reference. According to the illustrated embodiment, FFS captures a portion of the fuel supply stream; and OBDS captures the entire fuel return stream. As a result, FFS is suitable for both conventional and return-less fuel systems. OBDS generally can be used only with fuel systems that return fuel to the main tank. The FFS fuel throughput can be also much lower than OBDS. Therefore, FFS has a much lower energy input requirement than OBDS, allowing smaller components and more compact installation. Beneficially, such smaller FFS components can be more easily located in the portion of the vehicle that houses the fuel tank.

Distillation.

As will be described in more detail below, a distillation column assembly 31 is provided to distill liquid fuel to form a volatile light fraction secondary fuel. One of the major distinctions between FFS and OBDS is that FFS employs the distillation column 33 to accomplish separation of light ends or light fraction fuel and heavy ends or heavy fraction fuel, whereas OBDS typically employs a simple flash drum. The distillation column 33 can provide much greater separation capability over that of the conventional or OBDS vaporizing chambers. For example, where OBDS was credited with increasing the amount of desired components by volume in the secondary fuel from 20-25% over that of conventional systems, to up to approximately 50% or so. The enhanced design of the FFS distillation column 33 can result in a significant increase in desired components, as high as between approximately 80-100%, depending upon the composition of the source feed fuel, environmental conditions, and internal configuration of the distillation column 33.

The distillation column 33 can be designed in a number of ways, so the FFS is not restricted to use of a particular design. That said, details of a particular design of the FFS distillation column 33 given below and shown diagrammatically in, for example, FIGS. 2-5, are provided for illustrative purposes.

A brief discussion on distillation principles is appropriate to enhance understanding of FFS development. Distillation relies on the principles of phase equilibrium and gravimetric separation. In a typical vaporization chamber, liquid and vapor phases are brought into intimate contact so that they approach liquid-vapor equilibrium. The bottom of the vaporization chamber is heated and the top remains unheated. Cooler temperatures at the top shift equilibrium so that the vapor phase exiting the top of the vaporization chamber contains only the lightest compounds. The heavier components, concentrated in the liquid phase, will fall to the bottom of the column, where warmer temperatures drive equilibrium so that the heaviest compounds are concentrated in the bottoms liquid. Simultaneously, the lighter components are boiled away from the mixture at the bottom of the vaporization chamber. Light ends or light fraction components flow upward through the column; heavy ends or heavy fraction components flow downward. Effectively, the feed fuel components are distributed within the vaporization chamber so that the lowest and highest boiling point constituents are concentrated at the top and bottom of the column, respectively. The light end component vapors are then condensed and saved, and the heavy ends components are rejected. Repeated heating at the bottom of the vaporization chamber followed by condensing near the top of the chamber result in concentration of the heavy ends components in the bottom of the vaporization chamber.

Figure 2:
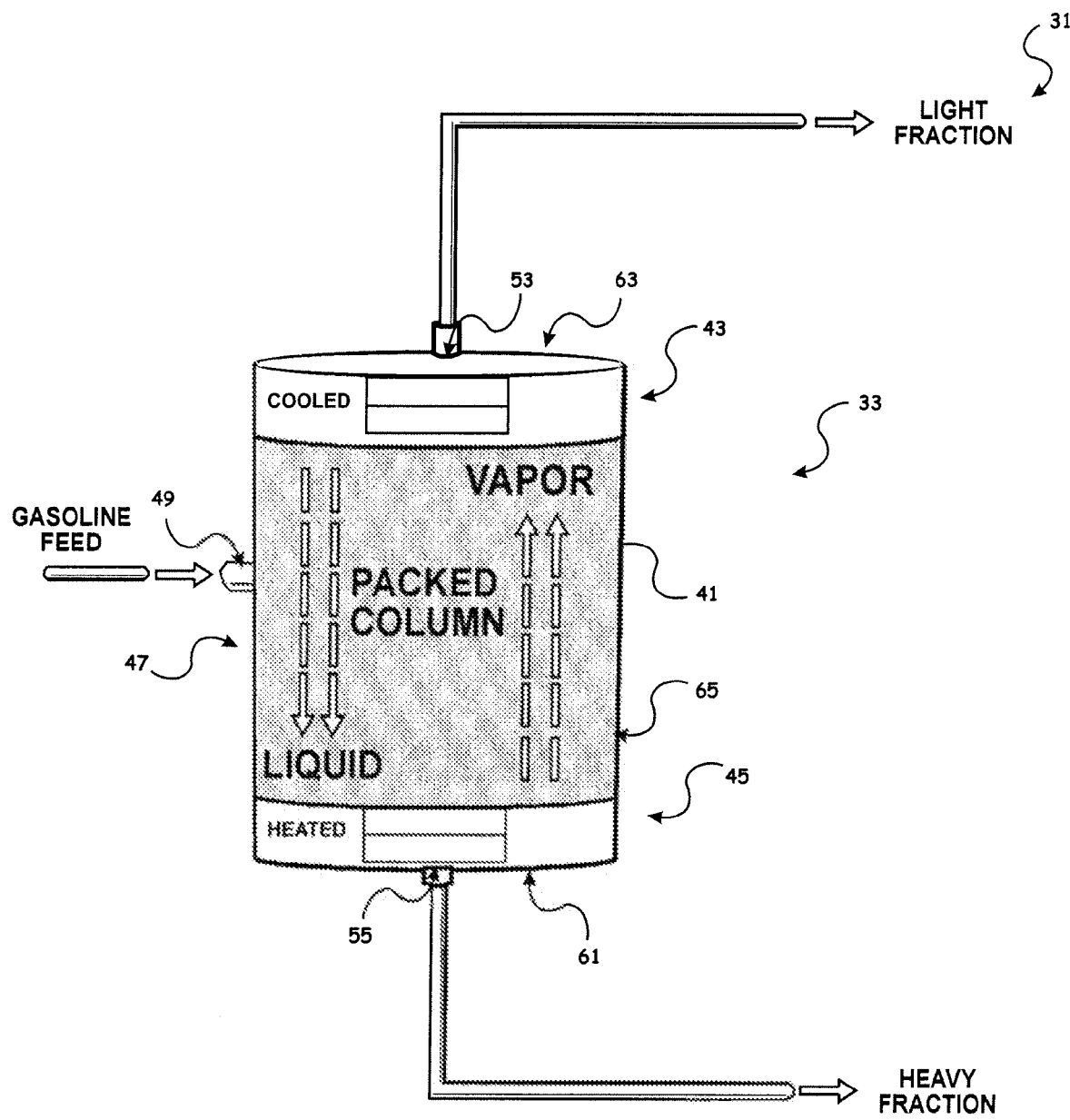
FIG. 2 is a schematic diagram of a distillation column of an FFS according to an embodiment of the present invention.
Figure 3:
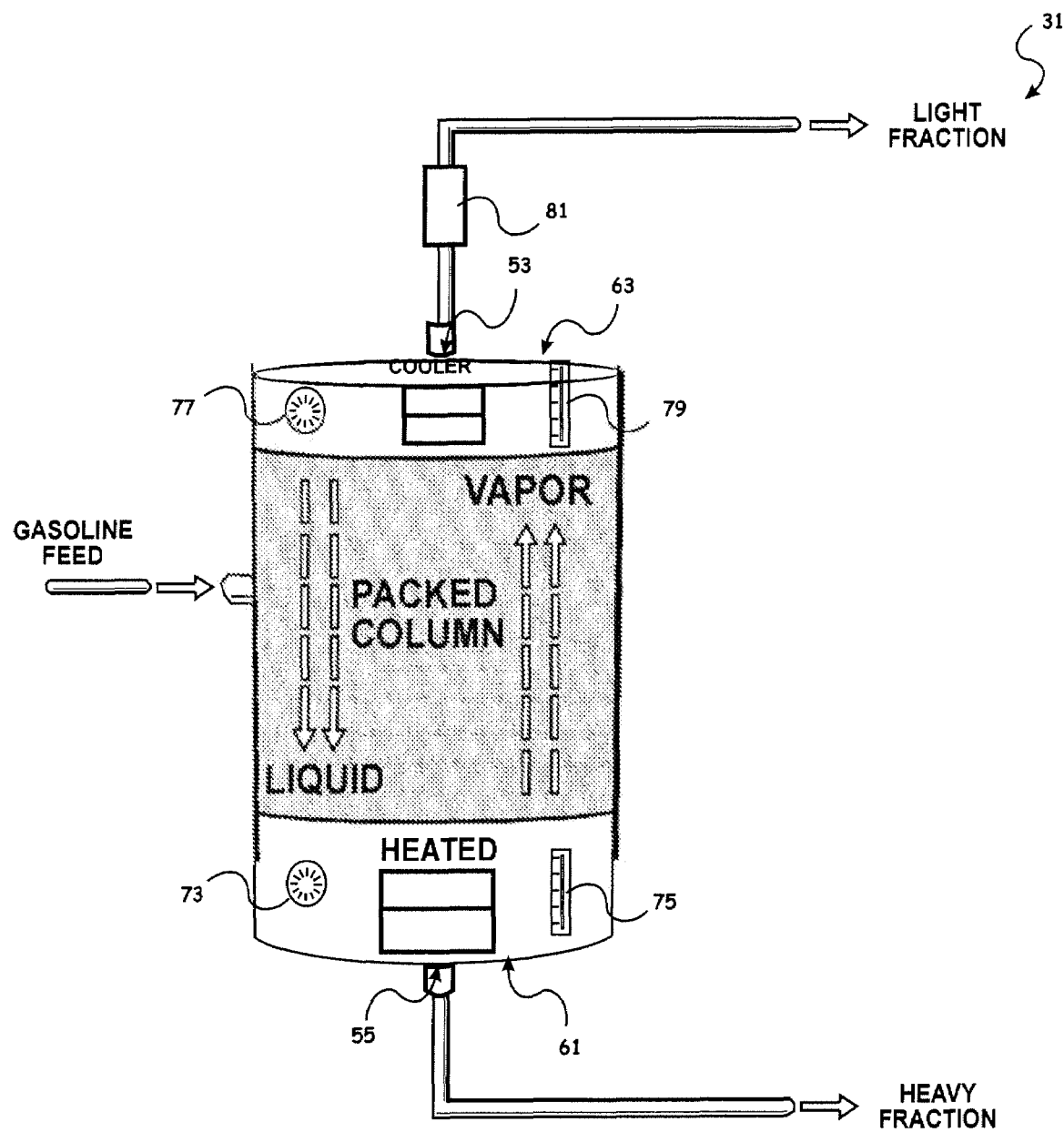
FIG. 3 is a schematic diagram of the distillation column shown in FIG. 2 including various sensors according to an embodiment of the present invention.

The distillation column assembly 31 shown in FIGS. 2 and 3 includes a distillation column 33, including an insulated housing 41 having an upper end portion 43, a lower end portion 45, and a medial portion 47 extending therebetween and having a fuel feed port 49 extending through a medial portion 47 of the housing 41 and positioned to receive feed fuel from a main fuel tank 51 (see, e.g., FIGS. 6-8) for distillation. The feed fuel includes light fraction fuel and heavy fraction fuel components. A light fraction output port 53 extends through an upper end portion 43 of the housing 41 and is positioned to allow output of distilled light fraction or light ends fuel components. A heavy fraction output port 55 extends through the lower end portion 45 of the housing 41 and is positioned to allow output of heavy fraction fuel components. Notably, although the placements of the ports 49, 53, and 55 are shown centered, various other configurations are within the scope of the various embodiments of present invention.

A vaporizing module 61 is positioned adjacent the lower end portion 45 of the housing 41 to at least partially, but preferably substantially completely, vaporize the feed fuel to enhance separation of the feed fuel into light fraction fuel and heavy fraction fuel components. The heat source for the vaporizing module 61 can be one that is substantially continuously available such as, for example, electrical resistance, thermoelectric heat pumps (see, e.g. FIG. 2), etc., or other means known to those skilled in the art; or one that is available only when the engine is functioning under normal operating conditions such as, for example, a vapor compression heat pump 67 (see, e.g. FIG. 5) such as a vehicle air-conditioning (compressor lines), engine coolant, engine exhaust or other means known to those skilled in the art.

A condensing module 63 is positioned adjacent the upper end portion 43 of the housing 41 to condense heavy fraction fuel components so that fuel exiting the light fraction output port 53 is substantially light fraction fuel components by volume. It is this cooling at the top 43 that establishes the required temperature gradient between top and bottom. The cooling source for the condensing module 61 can be one that is substantially continuously available such as, for example, a fan providing forced convection, a thermoelectric heat pump (see, e.g. FIG. 2), etc., or other means known to those skilled in the art; or one that is available only when the engine is functioning under normal operating conditions such as, for example, the vapor compression heat pump 67 (see, e.g. FIG. 5) such as a vehicle air-conditioning (evaporator lines).

A packed three-dimensional column 65 of heat conductive packing material, e.g., a porous metal such as a metallic fiber matrix, steel wool, etc., or other heat conductive material known to those skilled in the art, is positioned within the housing 41 between the vaporizing module 61 and the condensing module 63 to enhance fuel distillation. The enhanced surface area provided by conductive packing material results in enhanced recirculation within the distillation column and improved concentration of the light end component vapors at the top of the column and heavy ends components at the bottom.

Figure 4:
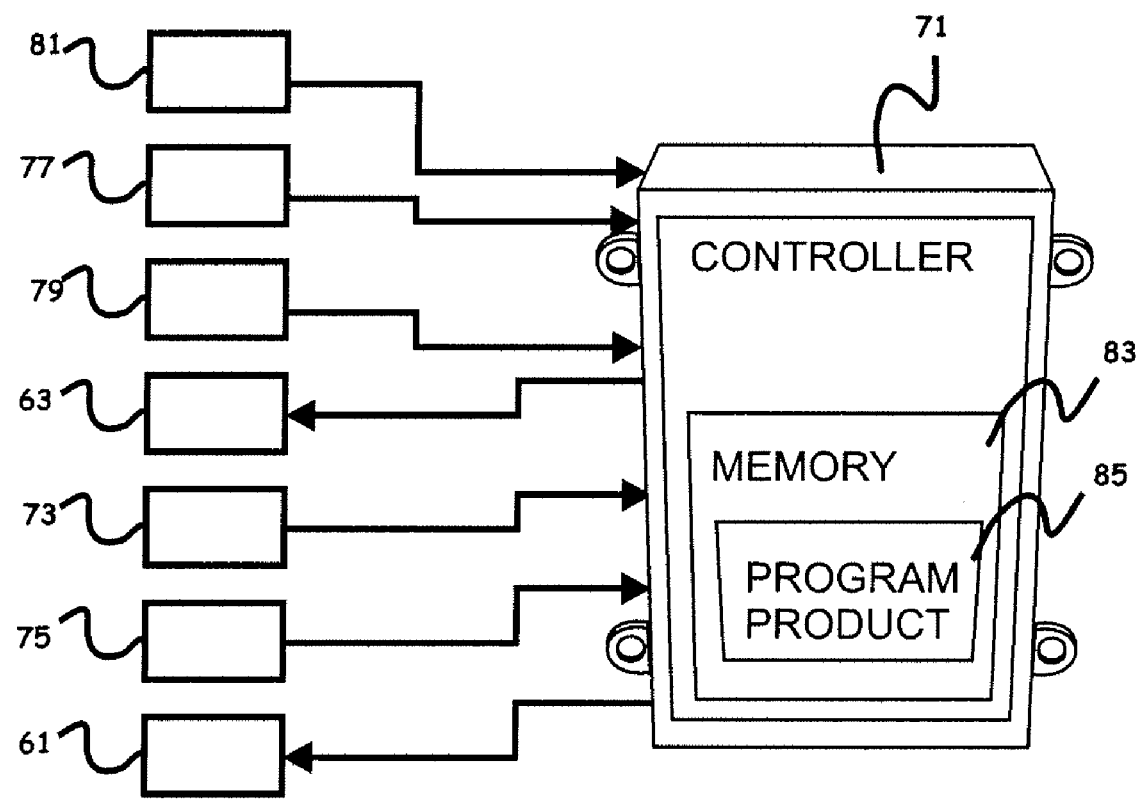
FIG. 4 is a schematic diagram of a distillation column controller interfacing with the various sensors to control vaporization and condensation within the distillation column according to an embodiment of the present invention.
Figure 5:
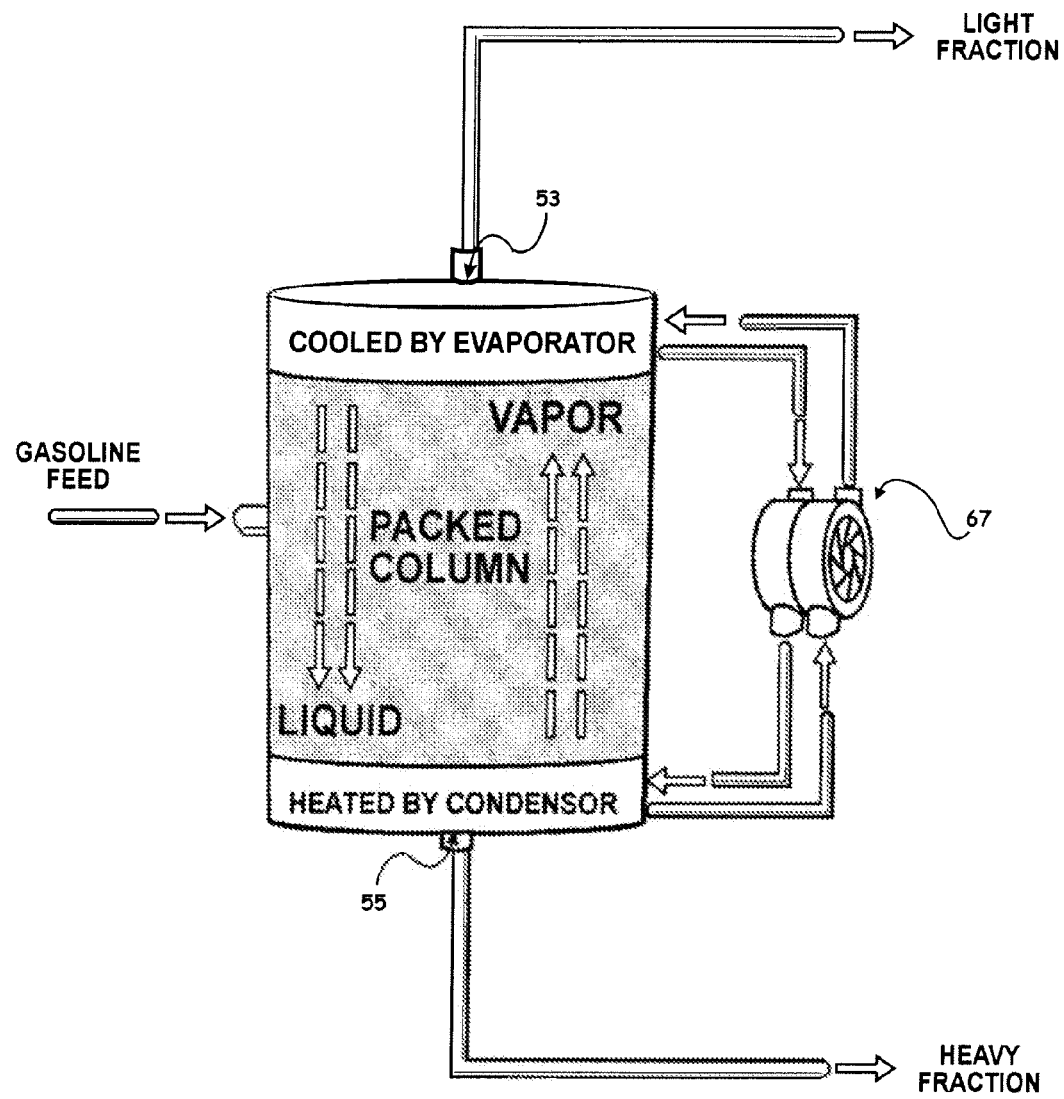
FIG. 5 is schematic diagram of a distillation column of an FFS according to another embodiment of the present invention.

As shown in FIG. 4, a controller 71 is provided to control the vaporization of the feed fuel by the vaporizing module 61 to thereby separate the feed fuel into the light and heavy ends components and to control the condensation of the heavy ends fuel by the condensing module 65 so that fuel exiting the light fraction output port 63 is substantially light fraction fuel components by volume. Beneficially, the controller 71 can ensure that the bottom 45 of the distillation column 33 is heated with a heating rate such that vapor generation occurs in the column 33 at a desired temperature and pressure, and can ensure that the top 43 of the distillation column 33 is cooled such that condensation occurs at a desired temperature and pressure.

As shown in FIGS. 3 and 4, the distillation column assembly 31 can include a vaporizing module pressure sensor 73 positioned to sense vaporizing module fuel pressure, a vaporizing module temperature sensor 75 positioned to sense vaporizing module fuel temperature, a condensing module pressure sensor 77 positioned to sense condensing module fuel pressure, and a condensing module temperature sensor 79 positioned to sense condensing module fuel temperature. The distillation column assembly 31 can also include a density sensor 81 positioned to determine at least one of the following: light fraction fuel density or specific gravity, to thereby determine light fraction fuel volumetric quality of the fuel output from the light fraction fuel output port 53. Correspondingly, according to this embodiment of the present invention, the controller 71 is responsive to the vaporizing module fuel pressure and the vaporizing module fuel temperature to control that amount of energy to be applied to the vaporizing module 61, and responsive to the condensing module fuel pressure, condensing module fuel temperature, and the density or specific gravity of the light fraction fuel output from the light fraction fuel output port 53, to control that amount of energy to be applied to the condensing module 63. The controller 71 can include memory 83 and a program product 85 stored therein and including instructions that when executed cause the controller 71 perform the operations of controlling the vaporization and condensing modules 61, 63, responsive to the above described signal inputs.

According to an embodiment of the present invention, such configuration of the distillation column 33 employing the combination of positive controlled heating at the bottom 45 and positive controlled cooling at the top 43 and utilization of a packing 65 having sufficient surface area therebetween, can readily result in the fuel exiting the light fraction fuel port 53 being substantially light fraction fuel components by volume, for example, to a level of approximately between 80-100 percent hydrocarbons with a carbon number of six or below and having a mean boiling point of, for example, less than approximately 70° C. In an embodiment of the present invention, the fuel exiting the light fraction fuel port 53 can include as a main component isopentane having a boiling point of approximately 28° C., thus, enhancing vaporization potential within the engine intake.

Overhead Condenser and Compressor.

Figure 6:
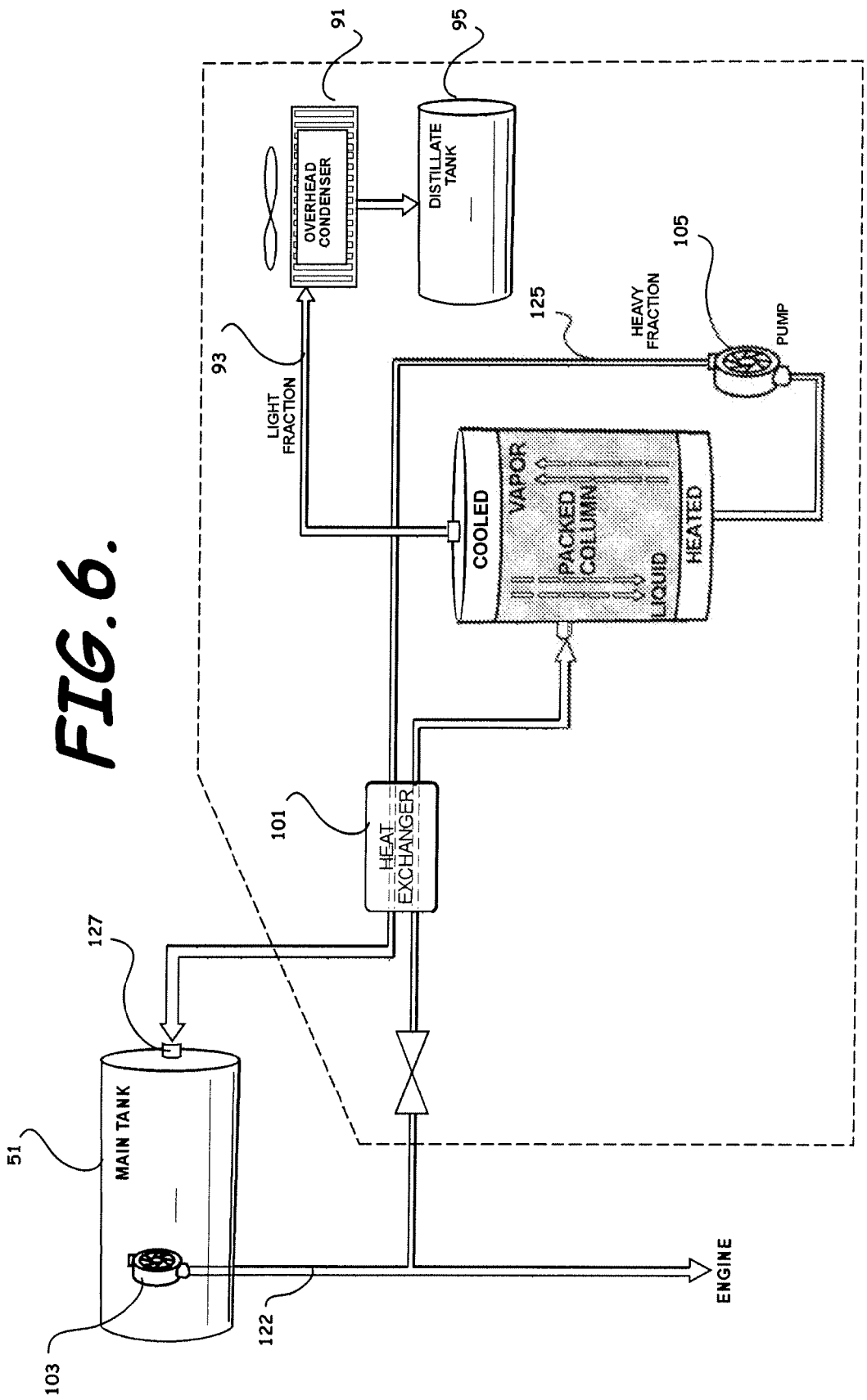
FIG. 6 is schematic diagram of fluid flow through an FFS, with feed preheater (labeled "Heat Exchanger") shown and bottoms liquid returned to a main fuel tank according to an embodiment of the present invention.
Figure 7:
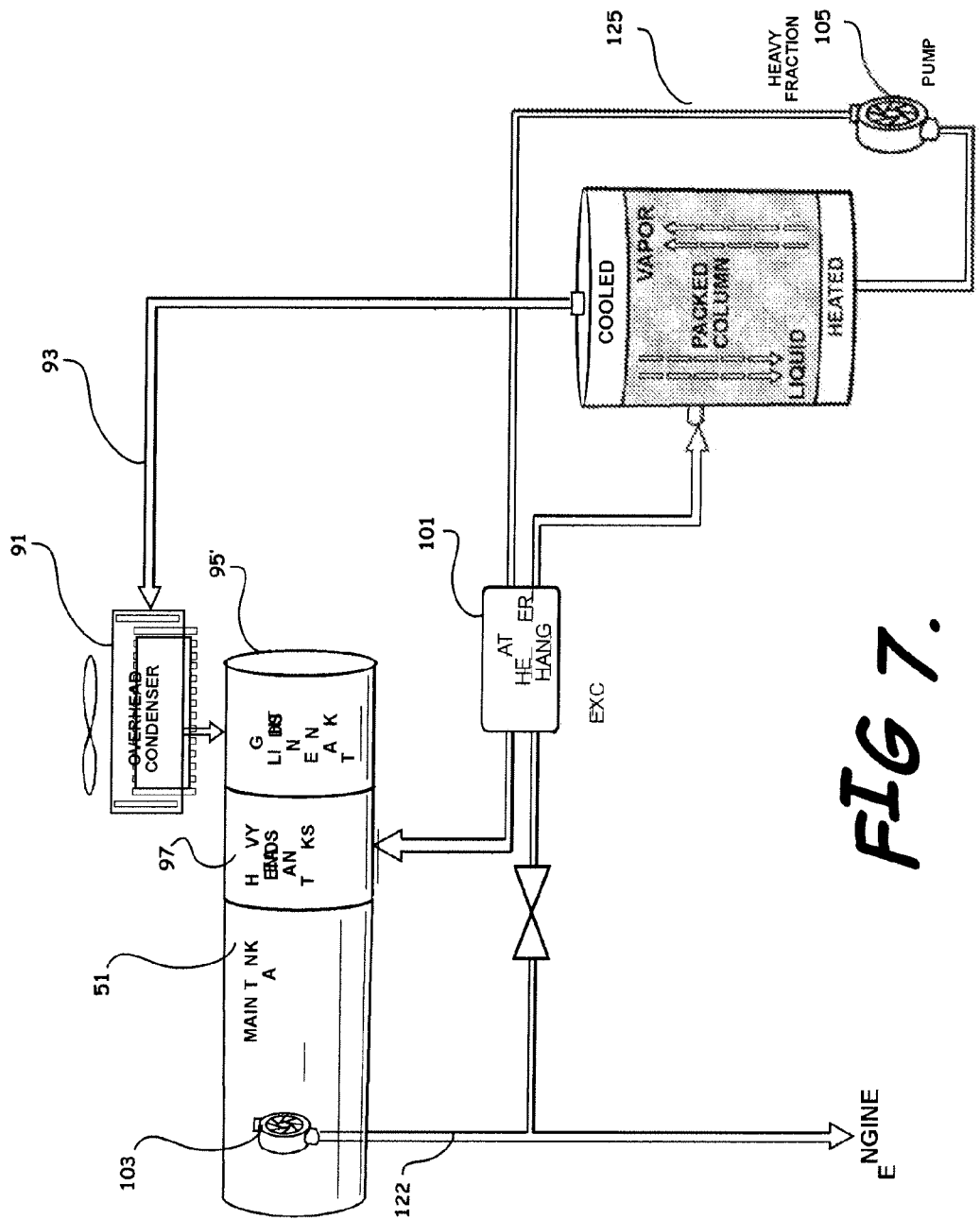
FIG. 7 is a schematic diagram of fuel fluid flow through FFS with heavy ends (bottoms liquid) routed to an exclusive tank, part of or connected to the main fuel tank, according to another embodiment of the present invention.
Figure 8:
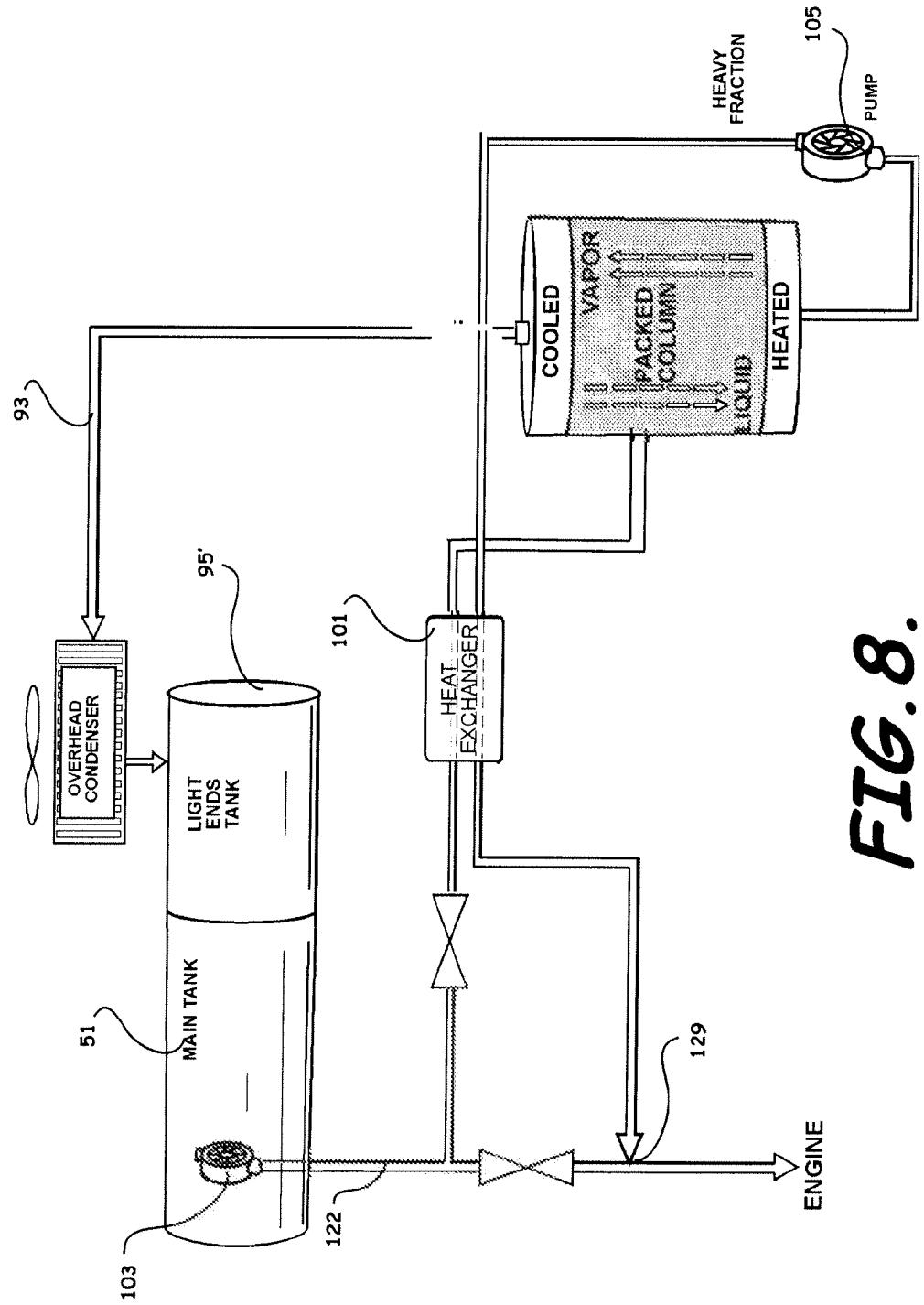
FIG. 8 is schematic diagram of fuel flow through FFS with bottoms liquid (heavy ends) consumed by an engine according to an embodiment of the present invention.

As shown in FIGS. 6-8, FFS can employ active cooling and/or compression to facilitate condensation and storage of the light ends in the overhead vapor stream exiting the output port 53. Particularly, the cooling can be provided most easily via an overhead condenser 91 containing, for example, thermoelectric cooling elements or others known to those skilled in the art, and positioned inline along a fuel line 93 extending from the light fraction output port 53. A light ends distillate tank 95 is provided for storing light fraction fuel cooled by the condenser 91. This distillate tank 95 can be either a separate tank (see, e.g., FIG. 6) or a compartment 95' within or adjacent to the main tank 51 (see, e.g., FIGS. 7-8). As portions of the light fraction or light ends fuel can be in gas form at relatively moderate temperatures, a compressor (not separately shown) is also or alternatively positioned in fluid communication with the fuel line 93 and the distillate tank 95, 95', for compressing the fuel for storage in the light ends distillate tank 95, 95'. In the exemplary embodiment of the present invention, the compressor forms part of the overhead condenser 91. In an alternate embodiment of the present invention, the overhead condenser 91 can be replaced by a compressor capable of compressing fluid containing gas and liquid components.

Disposition of Heavy Ends.

The increased efficiency of the FFS separation means that much less bottoms (heavy ends) fuel is generated from a given amount of feed fuel, and the bottoms fuel that is generated is mostly devoid of light ends components. With OBDS and conventional fuel systems, separation of the light ends components from the base fuel was found to be somewhat imperfect, and the bottoms liquid was found to contain a considerable fraction of light ends. Therefore, it was desirable to return the bottoms fluid to the main tank. Practically speaking, in a typical configuration, the entire contents of the OBDS main fuel tank flowed through the OBDS vapor separator several times during the distillation of an appreciable amount of starting fuel. Beneficially, due to the enhanced efficiency of the above-described distillation column 33, there is generally little to no advantage in "re-running" any of the heavy ends fuel output through the output port 55 through the distillation column 33. As such, as shown, for example in FIG. 7, the heavy ends or heavy fraction fuel can be stored in a separate heavy ends tank (not shown) or a compartment 97 of the main tank 51. Beneficially, the separate-tank or compartment configuration can also help eliminate concerns associated with increased evaporative emissions from warming the fuel in the main tank 51.

After the engine is fully warmed, the heavy ends fuel can be consumed by the engine, either directly as shown in FIG. 8, or via fuel lines extending from the heavy ends tank shown in FIG. 7. The heavy ends fuel should have a very high octane rating, allowing for the combination with ignition of timing advance for enhanced power output/torque from the engine, described in more detail later. Note, in a first configuration, the engine can run entirely on heavy ends fuel during normal fully warm operations, with the fuel system converting substantially the entire contents of the main tank 51 into light ends and heavy ends components. In a second configuration, warm operation fuel selection can be alternated between main tank fuel and heavy ends fuel by a valve (not shown) associated with the main fuel tank 51. Various other selection configurations for utilization of the heavy ends fuel are within the scope of the present invention.

Heat Recovery.

FFS can use a preheater in the form of a heat exchanger 101 to preheat the distillation column feed fuel stream and cool the hot heavy ends stream exiting the distillation column bottom 45. The heat exchanger 101 can accomplish two primary tasks. First, in the configuration shown, for example, in FIG. 6, the heat exchanger 101 helps mitigate concerns about increasing evaporative emissions due to an increase in main fuel tank temperature resulting from sending warm fuel into the main tank, by sending cooler (cooled) fuel to the main fuel tank. Second, in all configurations, it can help conserve energy that would otherwise need to be applied in the distillation column 33 by recovering heat that would ordinarily be sent to the main fuel tank 51 or elsewhere.

According to an embodiment of the present invention shown in FIG. 6, a heat exchanger 101 is positioned in a flow path between the heavy fraction output port 55 and the main tank 51, and in a liquid flow path between the main tank 51 and the fuel feed port 49 so that heat is exchanged between heavy fraction fuel flowing from heavy fraction output port 55 to the main tank 51 and feed fuel flowing from a flow path between the main tank 51 and the distillation column 33 so that the heavy fraction fuel is cooled prior to return to the main tank 51. Beneficially, this heat exchange helps reduce evaporative emissions associated with warm fuel and service to pre-heat the feed fuel entering the distillation column 33 to thereby reduce vaporization energy requirements. Pressure to force or otherwise translate the feed fuel through the heat exchanger 101 can be via a main tank fuel pump 103. Pressure to force or otherwise translate the heavy fraction fuel through the heat exchanger 101 can be via a heavy fraction fuel pump 105.

According to an embodiment of the present invention shown in FIG. 7, the heat exchanger 101 is positioned in a liquid flow path between the heavy fraction output port 55 and a heavy ends tank compartment 97 for storing heavy fraction fuel produced by the distillation column assembly 31, and in a liquid flow path between the main tank 51 and the fuel feed port 49, so that heat is exchanged between heavy fraction fuel flowing from heavy fraction output port 55 to the heavy ends tank 97 and feed fuel flowing from the flow path between the main tank 51 and the distillation column 33 so that the heavy fraction fuel is cooled prior to transfer to the heavy ends tank 97. Beneficially, this heat exchange helps to reduce evaporative emissions associated with warm fuel and serves to pre-heat the feed fuel entering the distillation column 33 to thereby reduce vaporization energy requirements.

According to an embodiment of the present invention shown in FIG. 8, the heat exchanger 101 is positioned in a liquid flow path between the heavy fraction output port 55 and the engine inlet, and in a liquid flow path between the main tank 51 and the fuel feed port 49 so that heat is exchanged between heavy fraction fuel flowing from heavy fraction output port 55 to the engine inlet and feed fuel flowing from the flow path between the main tank 51 and the distillation column 33 to pre-heat the feed fuel entering the distillation column 33, to thereby reduce vaporization energy requirements.

Fuel Utilization.

Figure 9:
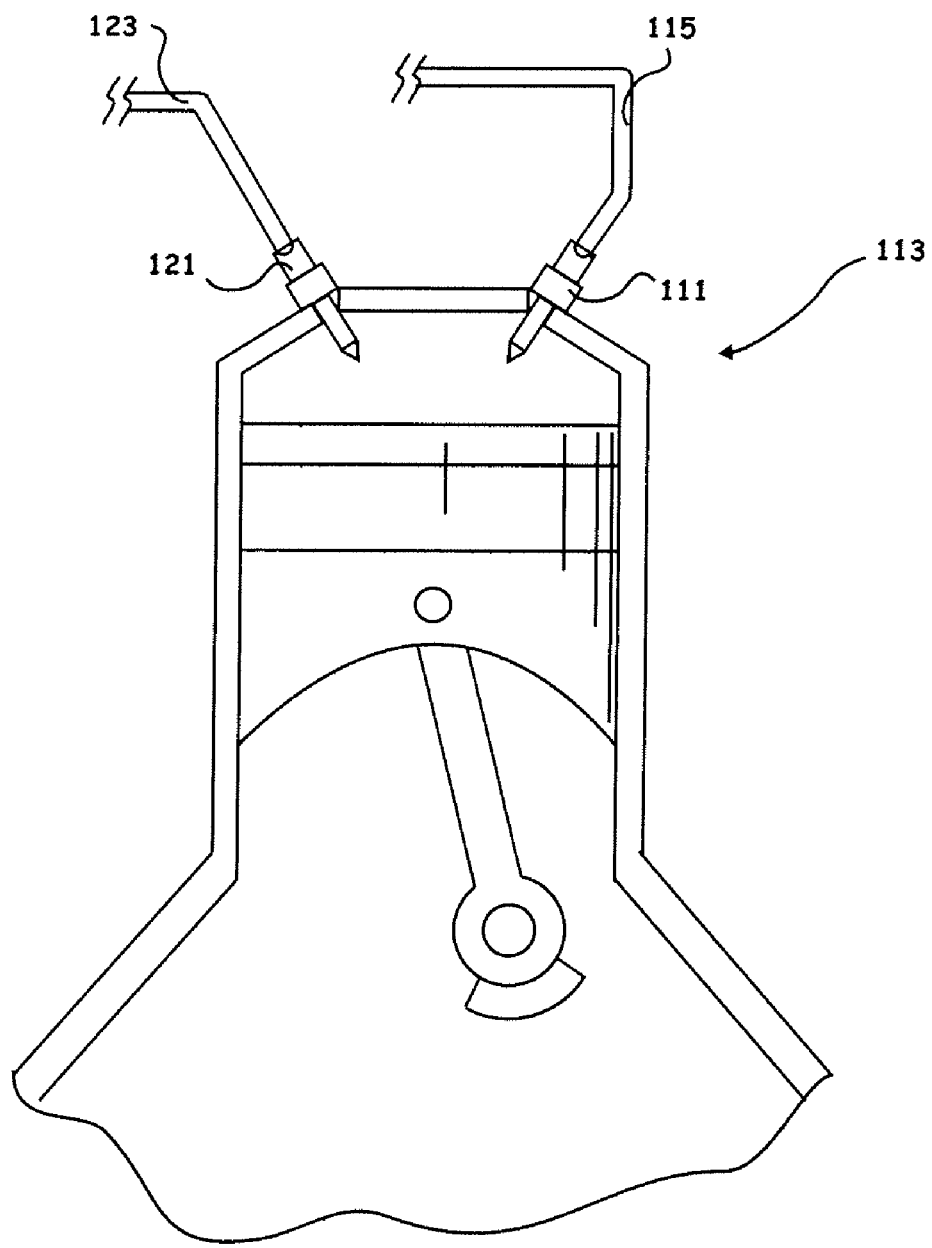
FIG. 9 is a schematic diagram of engine fuel intake having primary and secondary fuel injectors according to an embodiment of the present invention.

As perhaps best shown in FIG. 9, according to an embodiment of the present invention, the fuel system can include a dedicated fuel injector(s) 111 for injecting the light fraction fuel into a engine fuel intake 113 positioned in fluid communication with a light fraction fuel line 115 extending between the light ends distillate tank 95, 95', and the engine fuel intake 113. This configuration represents optimum utilization of secondary light ends fuel, on demand, but at the expense of having an additional fuel injector(s) 111 over that of the primary 121.

Figure 10:
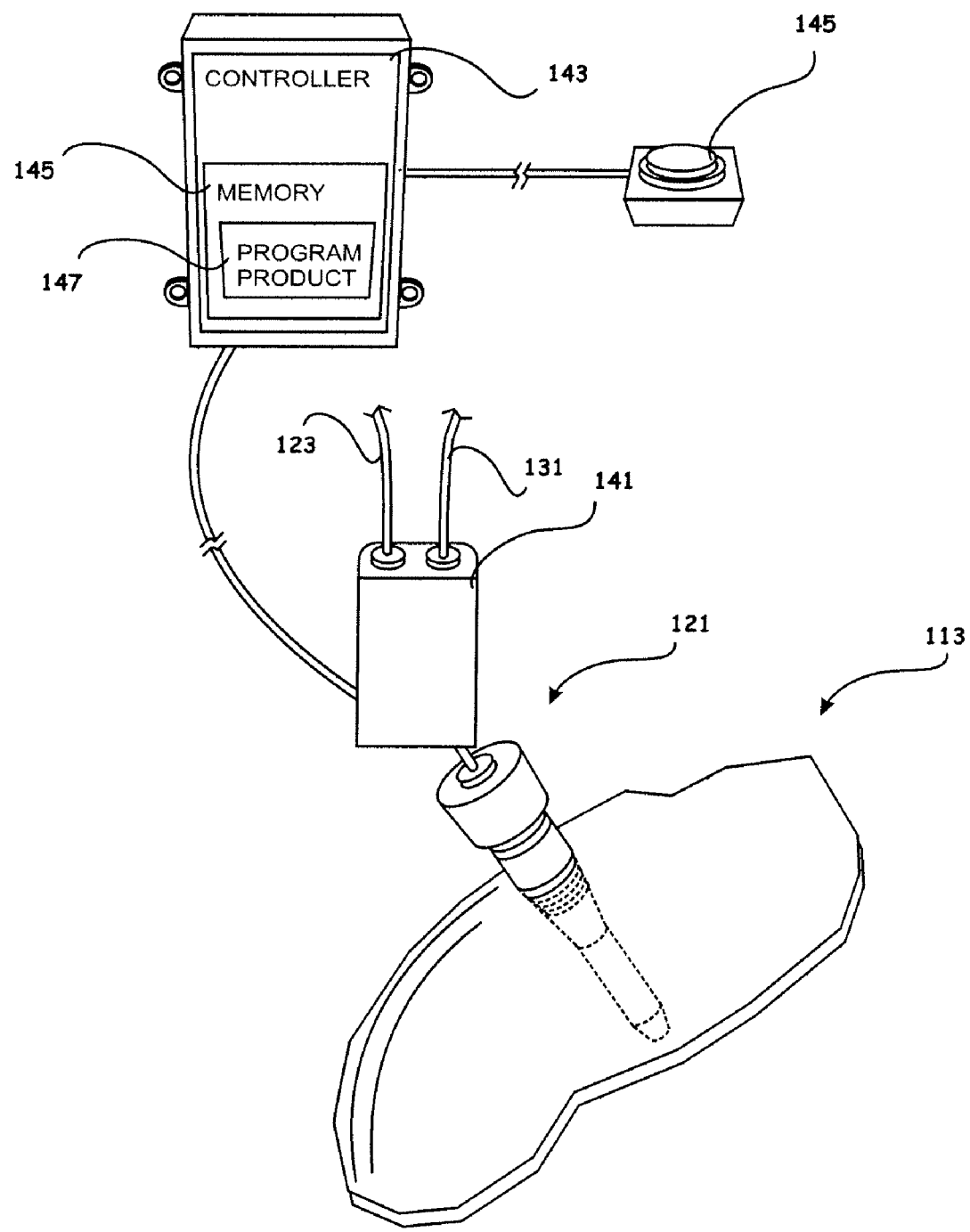
FIG. 10 is a schematic diagram of a fuel injector connected to a valve and a controller to select between primary and secondary fuels according to an embodiment of the present invention.

As perhaps best shown in FIG. 10, according to another embodiment of the present invention, the fuel system can include a shared fuel injection assembly or fuel injector 121. In such configuration, a primary fuel line 123 for injecting primary fuel into the engine intake 113 extends between fuel injector 121 and the main fuel tank 51 or extends from or is a continuation of the feed fuel line 122 extending between the main fuel tank 51 and the fuel feed port 49 of the distillation column 33. A heavy fraction fuel line 125 extends between the heavy fraction output port 55 and either a main fuel tank return port 127 in the main fuel tank (see, e.g., FIG. 6), a heavy fraction exclusive tank compartment 97 to (see, e.g., FIG. 7), or a tap 129 in the primary fuel line (see, e.g., FIG. 8). The fuel system also includes a light fraction fuel line 131 extending between the light ends distillate tank 95, 95', and the fuel injector 121 for injecting light fraction fuel into the engine intake 113.

A fuel type selection valve 141 is positioned in fluid communication with the light fraction fuel line 131, the primary fuel line 123, and the fuel injector 121. The fuel type selection valve 141 includes either mechanical or solid-state switching known to those skilled in the art to thereby respond to command signals provided by an engine controller 143 to select between the light fraction fuel line 131 and the primary fuel line 123 to communicate fuel to the shared fuel injector 121. That is, the engine controller 143 which can include a microprocessor or other logic components known to those skilled in the art, responsive to an engine start or an engine shutdown command, for example, from a user start/stop button 145, ignition key, etc. can provide command signals to the fuel type selection valve 141 to select between the light fraction fuel line 131 and the primary fuel line 123. The light fraction fuel line 131 is selected to supply light fraction fuel during start-up and warm-up operations and the primary fuel line 123 is selected to supply primary fuel storing normal warm engine operations.

According to an embodiment of the present invention, the engine controller 143 includes memory 145 and program product 147 stored in the memory 143 and including instructions that when executed cause the controller 143 to perform the operations of selecting the secondary light fraction fuel line 131 responsive to a shutdown command to purge feed fuel from the fuel injector 121 and fuel lines between the fuel injector and the fuel type selection valve 141. Beneficially, in a shared fuel injector 121 configuration, this can serve to help maximize application of light fraction fuel during the next start-up operation.

According to an embodiment of the present invention, after receiving a user shutdown command and as part of the purge operation, the engine controller 143 can allow the engine to run, e.g., 1-2 seconds, to allow the engine to burn any primary fuel left in the fuel injector and fuel lines between the valve 141 and fuel injector 121. According to another embodiment of the present invention, after receiving a user shutdown command and as part of the purge operation, the engine controller 143 can command the valve 141 to select the secondary light fraction fuel line 131 to allow the engine to run, e.g., 1-2 seconds, on secondary light fraction fuel, to thereby allow the engine to burn any primary fuel left in the fuel injector and fuel lines between the valve 141 and fuel injector 121 prior to shutdown. Note, this can be most efficiently accomplished using newly introduced pushbutton ignition start/shutdown systems to enhance user acceptance. Key-type ignition systems nevertheless remain compatible.

Engine Performance.

In most modern engines, the engine is controlled by an engine controller including, for example, a microprocessor or other solid-state device known to those skilled in the art. The engine controller generally includes memory and a program or firmware stored in the memory and including instructions to perform various engine management operations. Such engine also typically includes an engine ignition assembly having variable ignition timing and an engine exhaust assembly having an exhaust gas catalyst, e.g., catalytic converter, which has a minimum threshold operational temperature.

Figure 11:
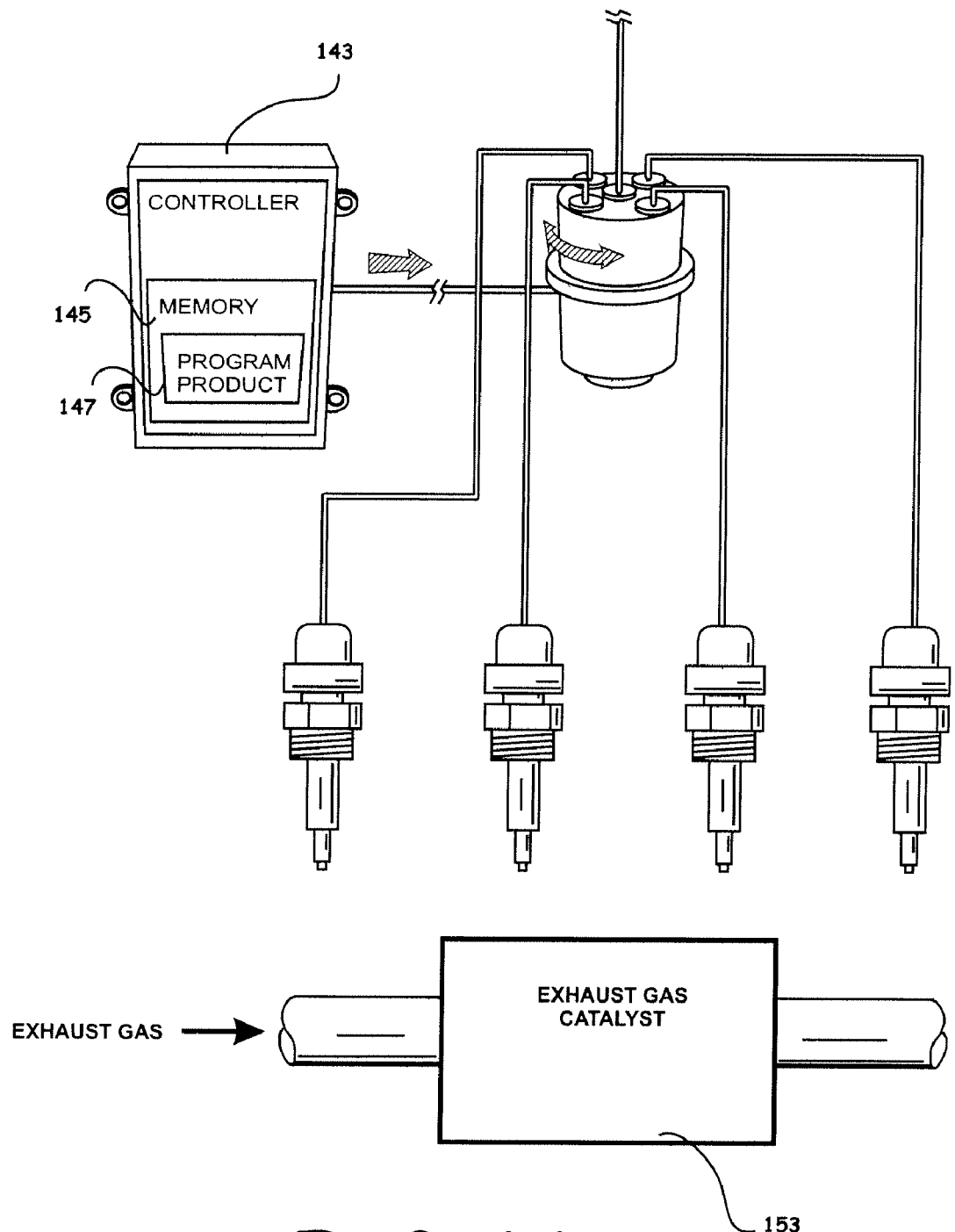
FIG. 11 is a schematic diagram of an engine controller for providing ignition timing advance and retard according to an embodiment of the present invention.

As perhaps best shown in FIGS. 10 and 11, according to an embodiment of the present invention, the engine controller 143 or a separate engine controller (not shown) in communication therewith includes instructions to perform the operations of selecting the secondary light fraction fuel to be injected in the engine intake 113 during start-up and warm-up operations, and retarding engine ignition timing responsive to selecting the secondary light fraction fuel to increase exhaust gas temperature entering the exhaust gas catalyst (e.g., catalytic converter) 151. Beneficially, the secondary light fraction component quality of the secondary light fraction fuel, made according to embodiments of the present invention, can allow for retarding ignition timing 153 to thereby enhance catalyst warm-up beyond that considered possible with the OBDS or other conventional systems. The instructions can also include those to perform the operations of selecting the primary fuel to be injected in the engine intake 113 during normal warm engine operations, and advancing ignition timing responsive to selection of the primary fuel enhanced with or composed of heavy fraction fuel to thereby enhance engine torque. Particularly, when the primary fuel is entirely heavy fraction fuel made according to embodiments of the present invention, ignition advancement can be beyond that considered possible with the OBDS or other conventional systems.

Various embodiments of the FFS system beneficially solve many problems inherent with the OBDS and other prior designs. For example, FFS can provide more efficient separation of the heavy fraction and the light fraction components to yield much faster start-up fuel generation rates with lower required power consumption. Also, for example, FFS can provide waste heat recovery from the heavy fraction fuel stream. Where OBDS typically returns the hot bottoms stream to the main fuel tank, increasing bulk fuel temperatures and the risk of increased evaporative hydrocarbon emissions, embodiments of FFS solve this problem by recovering heat from the bottoms stream for preheating the incoming feed, which synergistically results in much lower power consumption requirements. Further, for example, FFS can be configured such that FFS is not reliant upon waste heat from the engine (coolant, exhaust, etc) to drive the distillation process. Thus, the engine need not be warmed before FFS can operate. Still further, due to the distillation efficiency of FFS, FFS can allow for lower overall energy consumption than that of OBDS or conventional fuel systems, for example, due to lower fuel throughput requirements resulting from such enhanced efficiency.

In the drawings and specification, there have been disclosed typical preferred embodiments of the invention and, although specific terms are employed, they are used in a generic and descriptive sense only and not for the purpose of limitation, the scope of the invention being set forth in the following claims. Embodiments of FFS also may be advantageous for Homogeneous Charge Compression Ignition (HCCI) engines and for diesel engines. Further, embodiments of the present invention, for example, may potentially require a segregated fuel tank (Main/Heavy/Light or Main/Light) because the start-up fuel, more concentrated in light ends than with OBDS or conventional fuel systems, may require pressurized and/or chilled storage. Further, the engine controller may require re-calibration of its fueling routines that compensate for transient load conditions when the engine consumes the secondary light ends fuel due to its high-volatility starting fuel (distillate) or the high-octane heavy ends fuel due to its low-volatility.

That claimed is:

1. A fuel system for an engine having a fuel intake, comprising:
a main fuel tank for supplying a primary fuel to the engine;
a distillation column assembly including a distillation column to distill liquid fuel to form a volatile light fraction secondary fuel, the distillation column including:
  a housing having an upper end portion, a lower end portion, and a medial portion extending therebetween,
  a fuel feed port extending through the medial portion of the housing and positioned to receive feed fuel from the main fuel tank for distillation, the feed fuel including light fraction fuel components and heavy fraction fuel components,
  a light fraction output port extending through the upper end portion of the housing and positioned to allow output of distilled light fraction fuel components,
  a heavy fraction output port extending through the lower end portion of the housing and positioned to allow output of heavy fraction fuel components,
  a vaporizing module positioned adjacent the lower end portion of the housing to at least partially vaporize the feed fuel to enhance separation of the feed fuel into light fraction fuel components and heavy fraction fuel components,
  a condensing module positioned adjacent the upper end portion of the housing to condense heavy fraction fuel components so that fuel exiting the light fraction output port is substantially light fraction fuel components by volume, and
  a packed column comprising a three-dimensional column of porous heat conductive material positioned within the housing between the vaporizing module and the condensing module to enhance fuel distillation; and
a controller positioned to control the vaporization of the feed fuel by the vaporizing module to thereby control the separation of the feed fuel into the light fraction fuel components and heavy fraction fuel components, and positioned to control the condensation of the heavy fraction fuel components by the condensing module so that fuel exiting the light fraction output port is substantially light fraction fuel components by volume.

2. A system as defined in claim 1, wherein the fuel exiting the light fraction fuel output port is approximately between 80-100 percent hydrocarbons with a carbon number of six or below and having a mean boiling point of less than approximately 70° C.

3. A system as defined in claim 1, wherein the distillation column further comprises:
a vaporizing module pressure sensor positioned to sense vaporizing module fuel pressure;
a vaporizing module temperature sensor positioned to sense vaporizing module fuel temperature;
a condensing module pressure sensor positioned to sense condensing module fuel pressure; and
a condensing module temperature sensor positioned to sense condensing module fuel temperature.

4. A system as defined in claim 3,
wherein the controller is responsive to the vaporizing module fuel pressure and the vaporizing module fuel temperature to control that amount of energy to be applied to the vaporizing module; and
wherein the controller is responsive to the condensing module fuel pressure and the condensing module fuel temperature to control that amount of energy to be extracted from the condensing module.

5. A system as defined in claim 3, wherein the distillation column further comprises a condensing module density sensor positioned to determine at least one of the following: light fraction fuel density or specific gravity, to thereby determine light fraction fuel volumetric quality of the fuel output from the light fraction output port.

6. A system as defined in claim 5,
wherein the controller is responsive to the vaporizing module fuel pressure and the vaporizing module fuel temperature to control that amount of energy to be applied to the vaporizing module; and
wherein the controller is responsive to the condensing module fuel pressure, condensing module fuel temperature, and the density or specific gravity of the light fraction fuel output from the light fraction output port, to control that amount of energy to be extracted from the condensing module.

7. A system as defined in claim 1, further comprising:
a light ends distillate tank for storing light fraction fuel produced by the distillation column assembly;
a first light fraction fuel line extending between the light fraction output port and the light ends distillate tank; and
a light fraction fuel overhead condenser positioned in fluid communication with the first light fraction fuel line and the light ends distillate tank for condensing light fraction fuel in the first light fraction fuel line prior to entry into the light ends distillate tank.

8. A system as defined in claim 7, further comprising:
a second light fraction fuel line extending between the light ends distillate tank and the engine fuel intake; and
a dedicated fuel injector in fluid communication with the second light fraction fuel line for injecting the light fraction fuel into the engine fuel intake.

9. A system as defined in claim 7, further comprising a light fraction fuel compressor positioned in fluid communication with the first light fraction fuel line and the light ends distillate tank for compressing light fraction fuel in the first light fraction fuel line for storage in the light ends distillate tank.

10. A system as defined in claim 1, wherein the engine fuel intake includes a fuel injector, the system further comprising:
a feed fuel line extending between the main fuel tank and the fuel feed port of the distillation column;
a primary fuel line extending between the main fuel tank or the fuel feed line and the fuel injector for injecting primary fuel into the engine fuel intake;
a heavy fraction fuel line extending between the heavy fraction output port and one of the following: a main fuel tank return port in the main fuel tank, a heavy ends exclusive tank compartment, or a tap in the primary fuel line;

a light ends distillate tank for storing light fraction fuel produced by the distillation column assembly;

a first light fraction fuel line extending between the light fraction output port and the light ends distillate tank;

a secondary light fraction fuel line extending between the light ends distillate tank and the fuel injector for injecting light fraction fuel into the engine fuel intake;

a fuel type selection valve in fluid communication with the secondary light fraction fuel line, the primary fuel line, and the fuel injector and responsive to command signals to select between the secondary light fraction fuel line and the primary fuel line to communicate fuel to the fuel injector; and an engine controller responsive to an engine start or an engine shutdown command to provide command signals to the fuel type selection valve to select between the secondary light fraction fuel line and the primary fuel line, the secondary light fraction fuel line selected to supply light fraction fuel during start-up and warm-up operations and the primary fuel line selected to supply feed fuel storing normal warm engine operations.

11. A system as defined in claim 10, wherein the engine controller includes memory and program product stored in the memory, the program product including instructions that when executed cause the controller to perform the operations of providing a signal to the fuel type selection valve to select the secondary light fraction fuel line responsive to a shutdown command to purge feed fuel from the fuel injector and fuel lines between the fuel injector and the fuel type selection valve to thereby maximize application of light fraction fuel during a next start-up operation.

12. A system as defined in claim 1, further comprising one of the following:

a heat exchanger positioned in a flow path between the heavy fraction output port and the main fuel tank and in a liquid flow path between the main fuel tank and the fuel feed port so that heat is exchanged between heavy fraction fuel flowing from heavy fraction output port to the main fuel tank and feed fuel flowing from a flow path between the main fuel tank and the distillation column so that the heavy fraction fuel is cooled prior to return to the main fuel tank to thereby reduce evaporative emissions associated with warm fuel and to pre-heat the feed fuel entering the distillation column to thereby reduce vaporization energy requirements;

a heat exchanger positioned in a liquid flow path between the heavy fraction output port and a heavy ends tank compartment for storing heavy fraction fuel produced by the distillation column assembly, and in a liquid flow path between the main fuel tank and the fuel feed port, so that heat is exchanged between heavy fraction fuel flowing from heavy fraction output port to the heavy ends tank compartment and feed fuel flowing from the flow path between the main fuel tank and the distillation column so that the heavy fraction fuel is cooled prior to transfer to the heavy ends tank compartment to thereby reduce evaporative emissions associated with warm fuel and to pre-heat the feed fuel entering the distillation column to thereby reduce vaporization energy requirements; and a heat exchanger positioned in a liquid flow path between the heavy fraction output port and the engine fuel intake and in a liquid flow path between the main fuel tank and the fuel feed port so that heat is exchanged between heavy fraction fuel flowing from heavy fraction output port to the engine fuel intake and feed fuel flowing from the flow path between the main fuel tank and the distillation column to pre-heat the feed fuel entering the distillation column to thereby reduce vaporization energy requirements.

13. A system as defined in claim 1, wherein the engine includes an engine ignition assembly having variable ignition timing, and an exhaust assembly including an exhaust gas catalytic converter, the system further comprising an engine controller having memory including a program product comprising instructions to perform the operations of:

selecting the secondary light fraction fuel to be injected in the engine fuel intake during start-up and warm-up operations;

retarding engine ignition timing responsive to selecting the secondary light fraction fuel to increase exhaust gas temperature entering the exhaust gas catalytic converter to thereby enhance catalyst warm-up;

selecting the primary fuel to be injected in the engine fuel intake during normal operations; and advancing ignition timing responsive to selection of the primary fuel enhanced with heavy fraction fuel to thereby enhance engine torque.

14. A fuel fractionating system for an engine having a fuel intake, comprising a distillation column assembly including a distillation column to distill liquid fuel to form a volatile light fraction secondary fuel, the distillation column including:

a housing having an upper end portion, a lower end portion, and a medial portion extending therebetween, a fuel feed port extending through the medial portion of the housing and positioned to receive feed fuel from the main fuel tank for distillation, the feed fuel including light fraction fuel components and heavy fraction fuel components, a light fraction output port extending through the upper end portion of the housing and positioned to allow output of distilled light fraction fuel components, a heavy fraction output port extending through the lower end portion of the housing and positioned to allow output of heavy fraction fuel components, a vaporizing module positioned adjacent the lower end portion of the housing to at least partially vaporize the feed fuel to separate the feed fuel into light fraction fuel components and heavy fraction fuel components, and a condensing module positioned adjacent the upper end portion of the housing to condense heavy fraction fuel components so that fuel exiting the light fraction output port is substantially light fraction fuel components by volume.

15. A system as defined in claim 14, wherein the distillation column further includes a packed column comprising a three-dimensional column of porous heat conductive material positioned within the housing between the vaporizing module and the condensing module to enhance fuel distillation; and wherein the fuel components exiting the light fraction fuel port are approximately between 80-100 percent hydrocarbons with a carbon number of six or below.

16. A system as defined in claim 15, wherein the fuel exiting the light fraction fuel port has a boiling point of approximately less than 70° C., and wherein the primary component of the fuel exiting the light fraction fuel port is isopentane; and wherein the system further comprises a controller positioned to control the vaporization of the feed fuel by the vaporizing module to thereby control the separation of the feed fuel into the light fraction fuel components and heavy fraction fuel components, and positioned to control the condensation of the heavy fraction fuel components by the condensing module so that fuel exiting the light fraction output port is substantially light fraction fuel components by volume.

17. A system as defined in claim 14, wherein the distillation column further comprises:
   a vaporizing module pressure sensor positioned to sense vaporizing module fuel pressure;
   a vaporizing module temperature sensor positioned to sense vaporizing module fuel temperature;
   a condensing module pressure sensor positioned to sense condensing module fuel pressure; and
   a condensing module temperature sensor positioned to sense condensing module fuel temperature.

18. A system as defined in claim 17, further comprising a controller for controlling the vaporization of the feed fuel by the vaporizing module to thereby separate the feed fuel into the light fraction fuel components and heavy fraction fuel components and for controlling the condensation of the heavy fraction fuel components by the condensing module so that fuel exiting the light fraction output port is substantially light fraction fuel components by volume, the controller having memory and program product stored in the memory including instructions that when executed cause the controller to perform the following operations:
   receiving signals representing the vaporizing module fuel pressure and the vaporizing module fuel temperature;
   controlling the amount of energy to be applied to the vaporizing module responsive to the vaporizing module fuel pressure and vaporizing module fuel temperature signals;
   receiving signals representing the condensing module fuel pressure and the condensing module fuel temperature; and
   controlling that amount of energy to be extracted from the condensing module responsive to the condensing module fuel pressure and condensing module fuel temperature.

19. A system as defined in claim 17,
   wherein the distillation column further comprises a condensing module density sensor positioned to determine at least one of the following: light fraction fuel density or specific gravity to thereby determine light fraction fuel volumetric quality of the fuel output from the light fraction output port;
   wherein the controller is responsive to the vaporizing module fuel pressure and the vaporizing module fuel temperature to control that amount of energy to be applied to the vaporizing module; and
   wherein the controller is responsive to the condensing module fuel pressure, condensing module fuel temperature, and the density or specific gravity of the light fraction output from the light fraction fuel output port, to control that amount of energy to be extracted from the condensing module.

20. A system as defined in claim 14, further comprising:
   a light ends distillate tank for storing light fraction fuel produced by the distillation column assembly;
   a light fraction fuel line extending between the light fraction output port and the light ends distillate tank; and
   a light fraction fuel overhead condenser positioned in fluid communication with the light fraction fuel line and the light ends distillate tank for condensing light fraction fuel in the light fraction fuel line prior to entry into the light ends distillate tank.

21. A system as defined in claim 20, further comprising a light fraction fuel compressor positioned in fluid communication with the first light fraction fuel line and the light ends distillate tank for compressing light fraction fuel in the first light fraction fuel line for storage in the light ends distillate tank.

22. A system as defined in claim 14, further comprising:
   a light ends distillate tank for storing light fraction fuel produced by the distillation column assembly;
   a light fraction fuel line extending between the light ends distillate tank and the engine fuel intake; and
   a dedicated fuel injector in fluid communication with the light fraction fuel line for injecting the light fraction fuel into the engine fuel intake.

23. A system as defined in claim 14, wherein the engine fuel intake includes a fuel injector, the system further comprising:
   a feed fuel line extending between the main fuel tank and the fuel feed port of the distillation column;
   a primary fuel line extending between the main fuel tank or the fuel feed line and the fuel injector for injecting primary fuel into the fuel intake; and
   a heavy fraction fuel line extending between the heavy fraction output port and one of the following: a heavy ends exclusive tank compartment, or a tap in the primary fuel line.

24. A system as defined in claim 23, further comprising:
   a light ends distillate tank for storing light fraction fuel produced by the distillation column assembly;
   a first light fraction fuel line extending between the light fraction output port and the light ends distillate tank;
   a secondary light fraction fuel line extending between the light ends distillate tank and the fuel injector for injecting light fraction fuel into the fuel intake; and
   a fuel type selection valve in fluid communication with the secondary light fraction fuel line, the primary fuel line, and the fuel injector responsive to command signals to select between the secondary light fraction fuel line and the primary fuel line to communicate fuel to the fuel injector.

25. A system as defined in claim 24, further comprising an engine controller responsive to an engine start or an engine shutdown command to provide command signals to the fuel type selection valve to select between the secondary light fraction fuel line and the primary fuel line, the secondary light fraction fuel line selected to supply light fraction fuel during start-up and warm-up operations and the primary fuel line selected to supply feed fuel storing normal warm engine operations.

26. A system as defined in claim 25, wherein the engine controller includes memory and program product stored in the memory and including instructions that when executed cause the engine controller to perform the operations of selecting the secondary light fraction fuel line responsive to a shutdown command to purge feed fuel from the fuel injector and fuel lines between the fuel injector and the fuel type selection valve to thereby maximize application of light fraction fuel during a next start-up operation.

27. A system as defined in claim 14, further comprising a heat exchanger positioned in a flow path between the heavy fraction output port and the main fuel tank and in a liquid flow path between the main fuel tank and the fuel feed port so that heat is exchanged between heavy fraction fuel flowing from the heavy fraction output port to the main fuel tank and feed fuel flowing from a flow path between the main fuel tank and the distillation column so that the heavy fraction fuel is cooled prior to return to the main fuel tank to thereby reduce evaporative emissions associated with warm fuel and to pre-heat the feed fuel entering the distillation column to thereby reduce vaporization energy requirements.

28. A system as defined in claim 14, further comprising:
   a heavy ends tank compartment for storing heavy fraction fuel produced by the distillation column assembly; and
   a heat exchanger positioned in a liquid flow path between the heavy fraction output port and the heavy ends tank compartment for storing heavy fraction fuel produced by the distillation column assembly, and in a liquid flow path between the main fuel tank and the fuel feed port, so that heat is exchanged between heavy fraction fuel flowing from heavy fraction output port to the heavy ends tank compartment and feed fuel flowing from the flow path between the main fuel tank and the distillation column so that the heavy fraction fuel is cooled prior to transfer to the heavy ends tank compartment to thereby reduce evaporative emissions associated with warm fuel and to pre-heat the feed fuel entering the distillation column to thereby reduce vaporization energy requirements.

29. A system as defined in claim 14, further comprising a heat exchanger positioned in a liquid flow path between the heavy fraction output port and the engine fuel intake and in a liquid flow path between the main fuel tank and the fuel feed port so that heat is exchanged between heavy fraction fuel flowing from heavy fraction output port to the engine fuel intake and feed fuel flowing from the flow path between the main fuel tank and the distillation column to pre-heat the feed fuel entering the distillation column to thereby reduce vaporization energy requirements.

30. A method of fractionating fuel comprising the steps of:
   providing a distillation column assembly including a distillation column to distill liquid fuel to form a volatile light fraction secondary fuel, the distillation column including a light fraction output port extending through an upper end portion of the distillation column and positioned to allow output of distilled light fraction fuel, and a heavy fraction output port extending through a lower end portion of the distillation column and positioned to allow output of heavy fraction fuel;
   supplying feed fuel to the distillation column, the fuel including light fraction fuel and heavy fraction fuel components;
   vaporizing at least a portion of the supplied feed fuel in the distillation column to enhance separation of the feed fuel into light fraction fuel components and heavy fraction fuel components; and
   condensing a portion of the vaporized fuel by a condensing module prior to the vaporized fuel exiting the light fraction output port to condense the heavy fraction fuel components so that the vaporized fuel exiting the light fraction output port is substantially light fraction fuel components by volume.

31. A method as defined in claim 30, further comprising the step of exchanging heat between the feed fuel being fed into the distillation column assembly and heavy fraction fuel exiting the distillation column assembly.

\* \* \* \* \*

UNITED STATES PATENT AND TRADEMARK OFFICE
CERTIFICATE OF CORRECTION

| | | |
|---|---|---|
| PATENT NO. | : 7,370,610 B2 | Page 1 of 1 |
| APPLICATION NO. | : 11/676208 | |
| DATED | : May 13, 2008 | |
| INVENTOR(S) | : Marcus Ashford and Ron Matthews | |

It is certified that error appears in the above-identified patent and that said Letters Patent is hereby corrected as shown below:

Column 11, line 30, delete "145" after "button" and insert --144--; line 40, delete "143" after "memory" and insert --145--.

Column 12, line 22, delete "151" after "converter)" and insert --153--; line 26, delete "153" before "to".

In the Drawings, Sheet 10, Fig. 10, delete "145" and insert --144-- as shown below.

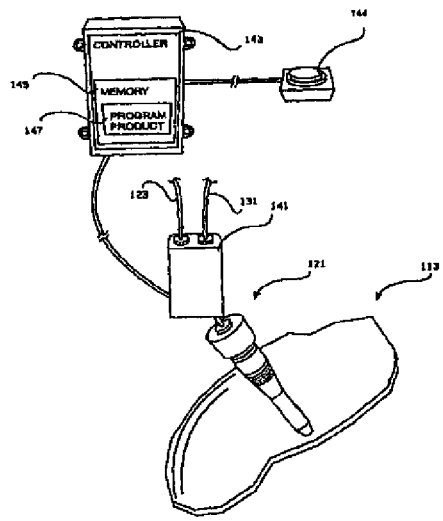

FIG.10.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,370,610 B2 |
| APPLICATION NO. | : 11/676208 |
| DATED | : May 13, 2008 |
| INVENTOR(S) | : Marcus Ashford and Ron Matthews |

It is certified that error appears in the above-identified patent and that said Letters Patent is hereby corrected as shown below:

Column 1, line 11 insert --This invention was made with government support under DE-FG04-99AL66262 awarded by Department of Energy. The government has certain rights in the invention.--

Signed and Sealed this

Twenty-fourth Day of November, 2009

David J. Kappos
*Director of the United States Patent and Trademark Office*